(12) United States Patent
Kim et al.

(10) Patent No.: US 8,834,625 B2
(45) Date of Patent: Sep. 16, 2014

(54) ULTRA-RAPID HARDENING HYDRAULIC BINDER USING REDUCED SLAG POWDER, AND METHOD OF PREPARING THE SAME

(71) Applicant: Ecomaister Co., Ltd, Incheon (KR)

(72) Inventors: Jin-Man Kim, Daejeon (KR); Eun-Gu Kwak, Asan-si (KR); Sang-Yoon Oh, Seoul (KR); Chang-Hak Kim, Incheon (KR); Ki-Woong Kang, Seoul (KR); Dong-Cheol Heo, Bucheon-si (KR)

(73) Assignee: Ecomaister Co., Ltd. (KR)

( * ) Notice: Subject to any disclaimer, the term of this patent is extended or adjusted under 35 U.S.C. 154(b) by 0 days.

(21) Appl. No.: 13/890,415

(22) Filed: May 9, 2013

(65) Prior Publication Data

US 2013/0269573 A1 Oct. 17, 2013

Related U.S. Application Data

(63) Continuation of application No. PCT/KR2011/004281, filed on Jun. 10, 2011.

(30) Foreign Application Priority Data

Nov. 10, 2010 (KR) .................. 10-2010-0111768

(51) Int. Cl.
*C04B 7/21* (2006.01)
*C04B 11/28* (2006.01)
*C04B 28/08* (2006.01)
*C04B 111/00* (2006.01)

(52) U.S. Cl.
CPC ....... *C04B 11/28* (2013.01); *C04B 2111/00215* (2013.01); *C04B 7/21* (2013.01); *C04B 28/08* (2013.01)
USPC .......................................... 106/782; 106/789

(58) Field of Classification Search
USPC ................................. 106/782, 789
See application file for complete search history.

(56) References Cited

U.S. PATENT DOCUMENTS

| 6,033,467 | A | 3/2000 | Krofchak |
| 6,776,839 | B2 | 8/2004 | Ko |
| 2003/0010060 | A1 | 1/2003 | Roth |

FOREIGN PATENT DOCUMENTS

| JP | 58137498 | A | * | 8/1983 |
| JP | 58140350 | A | * | 8/1983 |
| JP | 62027527 | A | * | 2/1987 |
| JP | 64-037450 | A | | 2/1989 |
| JP | 2000313907 | A | * | 11/2000 |
| JP | 2006210329 | A | * | 8/2006 |
| JP | 2008179504 | A | * | 8/2008 |
| KR | 89-004634 | B1 | | 11/1989 |
| KR | 1990-0000033 | B1 | | 1/1990 |
| KR | 1997-0008685 | B1 | | 5/1997 |
| KR | 10-0220340 | B1 | | 3/2000 |
| KR | 10-2000-0073776 | A | | 12/2000 |
| KR | 10-2002-0039520 | A | | 5/2002 |
| KR | 10-2006-0070618 | A | | 6/2006 |
| KR | 10-0755272 | B1 | | 9/2007 |
| KR | 10-2009-0070404 | A | | 7/2009 |

OTHER PUBLICATIONS

Ahmad et al, "Variation in Fineness of Fecto Cement and It's Effects on Other Properties of Cement and Concrete", 29$^{th}$ Conference on Our World in Concrete & Structures, pp. 109-116, Aug. 25-26, 2004.*
Hyun-Ho Lee et al, "Evalation of Chloride Penetration in Concrete with Ground Granulated Blast Furnace Slag Considering Fineness and Replacement Ratio", J Rec Const Resources, pp. 26-34, Jun. 2013.*
Reddy, A. Srinivasa et al., Utilization of Basic Oxygen Furnace (BOF) Slag in the Production of a Hydraulic Cement Binder, Int. J. Miner. Process. 2006, vol. 79, pp. 98-105. See pp. 98-99, 102-103.
Shi, Caijun et al., Alkali-Activated Cements and Concretes. New York: Taylor & Francis, 2006, ISBN 0-415-70004-3. See p. 46.
Zong, Yan-Bing et al., Component Modification of Steel Slag in Air Quenching Process to Improve Grindability. Trans. Nonferrous Met. Soc. China. 2009, vol. 19, pp. s834-s839. See pp. s834-s835.
International Search Report (PCT/KR2011/004281), Feb. 23, 2012.

* cited by examiner

*Primary Examiner* — Anthony J Green
(74) *Attorney, Agent, or Firm* — Park & Associates IP Law, P.C.

(57) ABSTRACT

Provided are an ultra-rapid hardening hydraulic binder including reduced slag powder and a method of preparing the same. The reduced slag powder is prepared by rapidly cooling molten electric arc furnace reduced slag, among by-products generated during an iron refinement process in a steel mill, to room temperature not to have free-calcium oxide by scattering the molten electric arc furnace reduced slag into the air using high-pressure gas by dropping the molten electric arc furnace reduced slag through a tundish.

1 Claim, 6 Drawing Sheets

| OXIDE (wt.%) | CaO | SiO₂ | Al₂O₃ | Fe₂O₃ | MgO | SO₃ | (Na₂O+K₂O) | FREE CaO |
|---|---|---|---|---|---|---|---|---|
| ORDINARY PORTLAND CEMENT | 60.0-67.0 | 17.0-25.0 | 3.0-8.0 | 0.5-6.0 | 0.1-4.0 | 1.0-3.0 | 0.5-1.3 | 0 |
| ULTRA-RAPID HARDENING CEMENT | 50.0±3.0 | 13.0±3.0 | 12.3 | 2.1 | 1.6 | 3.0 | 0 | 0 |
| SLOW-COOLED REDUCED SLAG | 66.6 | 12.4 | 12.4 | 2.1 | 1.6 | 3.0 | 0 | 11.0 |
| RAPIDLY COOLED REDUCED SLAG (PRESENT INVENTION) | 50.0 | 7.0 | 21.0 | 0.5 | 4.4 | 3.0 | 0.1 | 0 |

US 8,834,625 B2

ULTRA-RAPID HARDENING HYDRAULIC BINDER USING REDUCED SLAG POWDER, AND METHOD OF PREPARING THE SAME

REFERENCE TO RELATED APPLICATIONS

This is a continuation of pending International Patent Application PCT/KR2011/004281 filed on Jun. 10, 2011, which designates the United States and claims priority of Korean Patent Application No. 10-2010-0111768 filed on Nov. 10, 2010, the entire contents of which are incorporated herein by reference.

FIELD OF THE INVENTION

The present invention relates to a method of utilizing electric arc furnace reduced slag, which has conventionally gone to waste due to a high content of degradation-inducing free-calcium oxide (free-CaO), as a high-value added product. More particularly, the present invention relates to an ultra-rapid hardening hydraulic binder prepared by adding gypsum to reduced slag powder that is prepared by rapidly cooling electric arc furnace reduced slag among by-products generated during iron refinement in an iron smelter by scattering the electric arc furnace reduced slag using high-pressure gas and grinding the resultant, and a method of preparing the same. The ultra-rapid hardening hydraulic binder using electric arc furnace reduced slag powder may be applied to a variety of fields requiring ultra-rapid hardening materials. The rapidly cooled reduced slag may also be mixed with gypsum to adjust setting time and hardening time of the ultra-rapid hardening hydraulic binder, so as to replace ordinary Portland cement.

BACKGROUND OF THE INVENTION

Since the 1960's, the iron and steel industry has rapidly developed with increasing demand for iron and steel production in accordance with rapid economic growth. According to the Korea Iron and Steel Association, domestic crude steel production capacity exhibits a steady increase each year, in spite of a slight decrease in 1998 due to the IMF financial crisis, up to approximately 53 million tons in 2008 making Korea the world's sixth largest steelmaker.

The iron and steel industry consumes large quantities of raw materials and energy and generates a large quantity of steel slag as a by-product through complicated production processes such as iron-making, steel-making, rolling, and the like. The steel slag is classified into blast furnace slag and steel-making slag. The blast furnace slag is classified into water-cooled slag and slow-cooled slag (air-cooled slag), and the steel-making slag is classified into converter furnace slag and electric arc furnace slag. The electric arc furnace slag is classified into oxidized slag and reduced slag.

The steel-making slag is a more lightweight material than iron and is substantially separated by a difference in specific gravity, thereby hardly containing heavy metals. Accordingly, diverse research has been recently conducted into the steel-making slag as a construction material due to low environmental impact. However, since the steel-making slag contains free-calcium oxide (free-CaO), a chemical reaction occurs when the steel-making slag contacts water, thereby causing volumetric expansion. Thus, when the steel-making slag is used for roads or concrete, cracks occur. In this case, a method of using steel-making slag chemically stabilized by a post-treatment such as an aging process has been proposed. However, it is still low in reliability, so that its application is rare in practice.

In order to commercialize steel-making slag, a method of controlling an amount of free-CaO generated by rapidly cooling molten steel-making slag using high-speed air has recently been developed. Steel-making slag produced by this method is called either atomized steel slag (ASS), since the steel-making slag is spherical, or rapidly cooled steel slag, since the steel-making slag is obtained by a rapid cooling process.

The atomized steel slag has a low possibility of expansion collapse due to a low content of free-CaO. In addition, since the atomized steel slag is formed in a fine aggregate form which has a near spherical particle shape, the atomized steel slag used as a concrete construction material increases fluidity by a ball bearing effect. However, the atomized steel slag increases a possibility of segregation due to higher density thereof than other materials constituting the concrete, so that it is rarely applied to other general usages than special concrete due to the segregation possibility.

The amounts of steel slag produced in Korea were 16.62 million tons in 2006, 17.53 million tons in 2007, and 18.67 million tons in 2008, increasing by about 1 million tones every year. Such continuous increase in production of steel slag in recent years results from starting of the operation of Posco's Finex plant and an electric arc furnace of a hot-rolled steel mill by Hyundai Steel in Dangjin (The Korea Iron and Steel Association, 2008).

It was reported that the amount of recycled steel slag was 18.61 million tons in 2007, which was 99.7% of the total production of steel slag. The amounts of produced blast furnace slag and converter furnace slag were respectively 9.50 million tons and 5.40 million tons, and blast furnace slag and converter furnace slag were 100% recycled. The amount of recycled electric arc furnace slag was 3.707 million tons, which is 98.4% of the total production. Accordingly, it seems that recycling of steel slag has been efficiently carried out.

When the degree of recycling steel slag is evaluated, over 80% of blast furnace slag has been used to produce higher value-added products such as raw materials for cement, fertilizers, and the like, as a result of intensive efforts devoted to develop use of the blast furnace slag for recycling for a long period of time. Thus, it may be considered that the degree of recycling the blast furnace slag is relatively high. However, approximately 80% of steel-making slag has been used only for lower value-added construction aggregate. Thus, it may be considered that the degree of recycling the steel-making slag is relatively low. When the steel-making slag is used as the construction aggregate, a time-consuming aging process is required. Therefore, costs for recycling the steel-making slag increase.

On the other hand, electric arc furnace slag refers to industrial wastes discharged from a converter furnace or an electric arc furnace in which steel-making raw materials such as pig iron and scrap iron are refined. When the electric arc furnace slag is dumped into a landfill without being recycled, not only environmental problems such as fugitive dust and landfill leachate, but also economical problems such as securing of a large area landfill are caused. Thus, diverse research has been conducted into recycling of electric arc furnace slag. As a result of such efforts, Korean Industrial Standards (KS) for electric arc furnace oxidized slag fine aggregate have been established.

Although not statistically studied yet, electric arc furnace reduced slag accounts for approximately 20% of electric arc furnace slag. The amounts of the electric arc furnace reduced slag based on this rate are estimated to be about 0.75 million tons in 2007 and up to about 1 million tons in 2010. However, suitable recycling use for the electric arc furnace reduced slag has not been found, and thus the degree of recycling the electric arc furnace slag is reduced thereby. Thus, there is still a need to develop techniques of recycling the electric arc furnace reduced slag. However, due to a high content of free-calcium oxide, up to about 20%, contained in the electric arc furnace reduced slag, higher value-added products manufactured form the electric arc furnace reduced slag have yet to be reported.

Korean Patent Application Publication No. 10-2009-0070404 discloses a method of manufacturing a blended cement composition by adding fly ash and ordinary Portland cement to slow-cooled reduced slag as a method of recycling reduced slag.

In addition, U.S. Pat. No. 6,033,467 discloses a method of making cement using slag recovered from smelters of nickel, copper, lead, or zinc. However, this method is focused not on the production of blended cement but on a method of using waste to remove environmental contaminants. Therefore, products obtained from this method do not have particular advantageous characteristics.

U.S. Pat. No. 6,776,839 discloses blended cement having increased strength through Pozzolanic reaction with slag. However, the blended cement has a lower strength than ordinary Portland cement. This is because slow-cooled slag cannot have early hydraulicity as known in the art.

Korean Patent Application Publication No. 10-2002-0039520 discloses a method of preparing a non-sintered cement using blast furnace slag as a main material to improve a low early strength of cement, thereby replacing ordinary Portland cement.

Differently from the present invention, the above-mentioned documents disclose electric arc furnace reduced slag, which is slowly and sufficiently cooled, and also disclose a grinding process and a fabricating process after a cooling process. According to such conventional methods, space for cooling the electric arc furnace reduced slag is further required, and stability of free-calcium oxide after cooling needs to be secured. In order to overcome these problems, these documents also propose use of electric arc furnace reduced slag mixed with other waste materials or other additives. However, a manufacturing process is complicated, and manufacturing costs therefor increase according to these methods.

Meanwhile, cement and application products thereof generally harden at around 28 days, and desired properties thereof are achieved thereafter. Thus, rapid hardening cement and application products thereof are used for urgent construction of roads, bridges, harbors, sewer pipes, and the like.

It is known that rapid hardening cement is generally prepared by mixing clinker, which includes rapid hardening minerals, such as $CaO.Al_2O_3$, $12CaO.7Al_2O_3$, and $11CaO.7Al_2O_3.CaX$ (X: halogen element), with gypsum, and grinding the mixture, or by mixing powder of the rapid hardening minerals with ordinary Portland cement, gypsum, and other additives. (Korean Patent Publication Nos. 76-397 and 90-33 and Japanese Patent Application Publication Nos. sho 52-139819, 63-285114, and 64-37450)

However, physical properties of the above-mentioned rapid hardening cement vary depending on time of manufacture due to high manufacturing costs for clinker in a high-temperature sintering kiln and difficulty in controlling volatile components or melting components. Particularly, the rapid hardening cement varies in volume due to crystallization of ettringite ($3CaO.Al_2O_3.3CaSO_4.32H_2O$) caused by a high content of $Al_2O_3$ which is a main hydrous mineral exhibiting rapid hardening among hydrated compounds produced via reaction between cement and water, has decreased stability against water due to gel hydrates of $Al(OH)_3$, and expands in volume through reaction with $SO_4$ ions in the presence of sulfates. As a result, deterioration in structural stability has been regarded as problematic.

Methods of mixing ground Hauynite type clinker including calcium sulfo aluminate, as a main component, with ordinary Portland cement, gypsum, calcium hydroxide, and the like have been introduced (Korean Patent Publication Nos. 97-008685, 10-0220340, and 10-0310657), as methods of overcoming such performance drawbacks of cement and improving structural stability thereof after hardening.

Furthermore, Korean Patent No. 0310657 discloses a method of manufacturing rapid hardening cement. Korean Patent No. 0670458 discloses a method of manufacturing mortar utilizing rapid hardening cement. Korean Patent No. 0755272 discloses a method of manufacturing rapid hardening cement and latex concrete.

Generally, rapid hardening cement reacts with water to harden within several to several tens of minutes during the manufacture of mortar or concrete, for example, to have a strength of 20 MPa or more within 3 to 6 hours and forms a cement structure at an early stage. Thus, deformation caused by long-term evaporation of water may be minimized, and a stable structure in which cracks hardly occur may be formed. Accordingly, the rapid hardening cement is widely used for emergency repair of roads, bridges, and the like. However, most mortar developed to date does not utilize rapid hardening cement. Generally, most mortar-developing companies add functional ingredients to mortar to improve properties of mortar due to limits of technology for the rapid hardening cement. Thus, the development of a hydraulic binder having rapid hardening properties and not including functional ingredients is required.

SUMMARY OF THE INVENTION

Therefore, the present invention has been made in view of the above problems, and it is an object of the present invention to provide a hydraulic binder including recycled electric arc furnace reduced slag and having ultra-rapid hardening properties. In accordance with the present invention, the electric arc furnace reduced slag, which has conventionally gone to waste due to a high content of degradation-inducing free-calcium oxide (free-CaO), may be used as a high-value added product.

More particularly, reduced slag is collected in a molten state and cooled in lumps. However, separation rate of calcium oxide increases during a cooling process due to high basicity ($CaO/SiO_2$), so that the free-calcium oxide is changed into $Ca(OH)_2$, as calcium hydroxide, when the reduced slag contact moisture after a cooling process. Accordingly, volume of the reduced slag increases by 1.95 times, and degradation occurs by increase in internal separation pressure thereby. Thus, the reduced slag could not be used for other purposes even after hydration of free-calcium oxide is completed since hydration is a time-consuming process, and the hydrates degrade into powder. In order to overcome such drawbacks, according to the present invention, molten slag is scattered into the air using high-pressure gas and the scattered molten slag is rapidly cooled within several seconds to prepare slag that does not contain free-calcium oxide and have similar chemical composition to ultra-rapid hardening cement. As a result, the rapidly cooled electric arc furnace reduced slag may be used as a high value-added product. Therefore, it is an object of the present invention to provide an ultra-rapid hardening hydraulic binder including the rapidly cooled electric arc furnace reduced slag and a method of preparing the same.

In accordance with the present invention, the above and other objects can be accomplished by the provision of an ultra-rapid hardening hydraulic binder including reduced slag powder. The reduced slag powder is prepared by rapidly cooling molten electric arc furnace reduced slag, among by-products generated during an iron refinement process in a steel mill, to room temperature not to have free-calcium oxide by scattering the molten electric arc furnace reduced slag into the air using high-pressure gas by dropping the molten electric arc furnace reduced slag through a tundish.

The reduced slag powder may have a fineness of 3,000 to 12,000 $cm^2/g$.

The reduced slag powder may include 40 to 60% by weight of CaO, 5 to 15% by weight of SiO2, and 15 to 25% by weight of Al2O3 and does not have free-calcium oxide (free-CaO). A content of alumina (Al2O3) of the reduced slag powder improving rapid hardening, early strengthening, corrosion resistance, and fire resistance is twice to seven times greater than that of ordinary Portland cement or ultra-rapid hardening cement, and a content of magnesia (MgO, Periclase) of the reduced slag powder improving rapid hardening and strength and preventing cracking is twice to three times greater than that of ordinary Portland cement or ultra-rapid hardening cement.

The reduced slag powder may include a large amount of mayenite (C12A7, 12CaO.Al2O3), as a rapid hardening hydrate, and a large amount of β-C2S (Belite, β-2CaO.SiO2), as a main constituent compound of cement improving hydraulicity.

The ultra-rapid hardening hydraulic binder may further include gypsum selected from the group consisting of anhydrous gypsum, natural gypsum, and hemihydrated gypsum to control reaction rate of rapid hardening.

In accordance with an aspect of the present invention, the above and other objects can be accomplished by the provision of a method of preparing an ultra-rapid hardening hydraulic binder including reduced slag powder. The method includes rapidly cooling molten electric arc furnace reduced slag, among by-products generated during an iron refinement process in a steel mill, to room temperature not to have free-calcium oxide by scattering the molten electric arc furnace reduced slag into the air using high-pressure gas by dropping the molten electric arc furnace reduced slag through a tundish, grinding the rapidly cooled reduced slag to have a constant fineness, and adding gypsum to the ground reduced slag and mixing the mixture.

In comparison with conventional slow-cooling methods having a long aging process, high manufacturing costs due to a large landfill requirement, and environmental problems such as generations of fugitive dust, landfill leachate, and high noise, the present invention provides superior technology overcoming such drawbacks of conventional methods.

In addition, an ultra-rapid hardening hydraulic binder according to the present invention may be applied to a variety of fields requiring rapid hardening and may replace ordinary Portland cement by adjusting setting time and hardening time via mixing with gypsum.

In addition, since energy consumed for the manufacture of the ultra-rapid hardening hydraulic binder according to the present invention is limited only to a process of scattering molten slag and a process of grinding cooled particles, green house gas emissions are low. Thus, when the ultra-rapid hardening hydraulic binder according to the present invention is applied to replace ordinary Portland cement, which emits a large amount of carbon dioxide, green house gas emission may be directly reduced.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

To solve the technical problems, the present invention provides an ultra-rapid hardening hydraulic binder including reduced slag powder that does not include free-calcium oxide and is prepared by scattering molten electric arc furnace reduced slag into the air using high-pressure gas by dropping the molten electric arc furnace reduced slag through a tundish to rapidly cool the molten electric arc furnace reduced slag to room temperature.

According to the present invention, there is also provided an ultra-rapid hardening hydraulic binder including reduced slag powder having a fineness value of 3,000 to 12,000 $cm^2/g$.

According to the present invention, there is also provided an ultra-rapid hardening hydraulic binder including reduced slag powder that includes 40 to 60% by weight of CaO, 5 to 15% by weight of SiO2, and 15 to 25% by weight of Al2O3 and does not contain free-calcium oxide (free-CaO). Here, the reduced slag powder according to the present invention includes alumina (Al2O3) having a content twice to seven times greater than that of ordinary Portland cement or ultra-rapid hardening cement based on percent by weight and magnesia (MgO, Periclase) having a content twice to three times greater than that of the ordinary Portland cement or the ultra-rapid hardening cement based on percent by weight. In this regard, the alumina (Al2O3) accelerates a hardening process and improves early strengthening, corrosion resistance, and fire resistance, and the magnesia (MgO) accelerates the hardening process, improves strength, and prevents cracking.

According to the present invention, there is also provided an ultra-rapid hardening hydraulic binder including reduced slag powder that includes a large amount of mayenite (C12A7, 12CaO.Al2O3), as a rapid hardening hydrate, and a large amount of β-C2S (Belite, β-2CaO.SiO2), as a main constituent compound of cement improving hydraulicity.

According to the present invention, there is also provided an ultra-rapid hardening hydraulic binder further including a gypsum selected from the group consisting of anhydrous gypsum, natural gypsum, and hemihydrated gypsum to control reaction rate of rapid hardening.

The present invention also provides a method of preparing an ultra-rapid hardening hydraulic binder including reduced slag powder. The method includes: rapidly cooling molten electric arc furnace reduced slag, among by-products generated during an iron refinement process in a steel mill, to room temperature not to have free-calcium oxide by scattering the electric arc furnace reduced slag into the air using high-pressure gas by dropping the molten electric arc furnace reduced slag through a tundish; grinding the rapidly cooled reduced slag into powder having a uniform fineness value; and adding gypsum to the ground reduced slag and mixing the resultant.

Figures 1, 2:
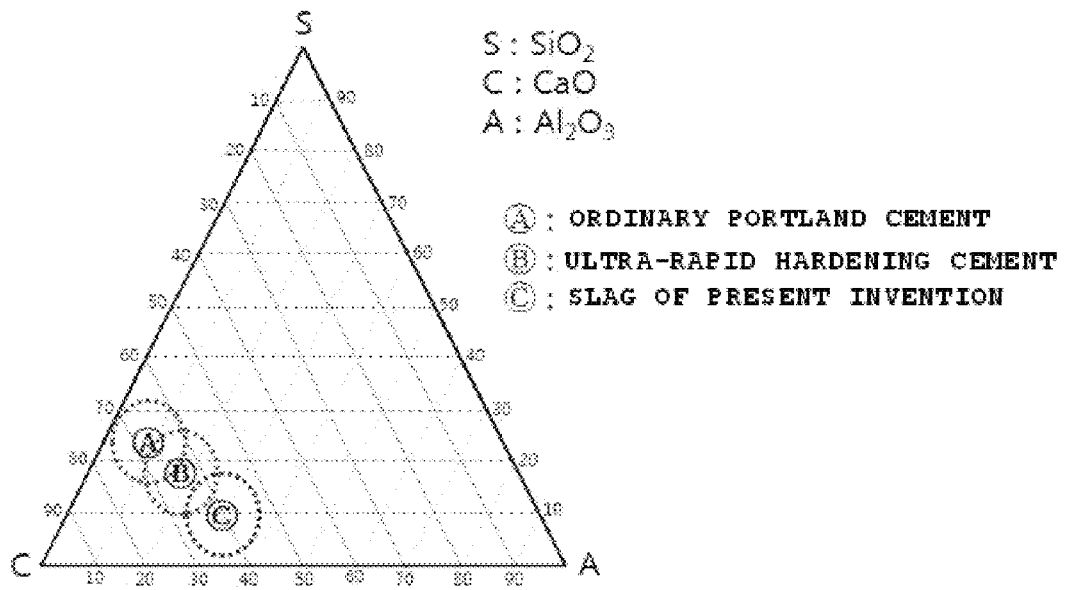
FIG. 1 is a table illustrating the composition of reduced slag according to the present invention.
FIG. 2 is a three-component graph of reduced slag according to the present invention and Portland cement.

According to the present invention, the molten electric arc furnace reduced slag is scattered into the air using high-pressure air such that the slag is cooled from 1400° C. to 600° C. within several seconds, and the scattered slag is cooled to 200° C. within several minutes. Conventional reduced slag has a substantially similar composition to ultra-rapid hardening cement as illustrated in FIGS. 1 and 2.

Figure 3:
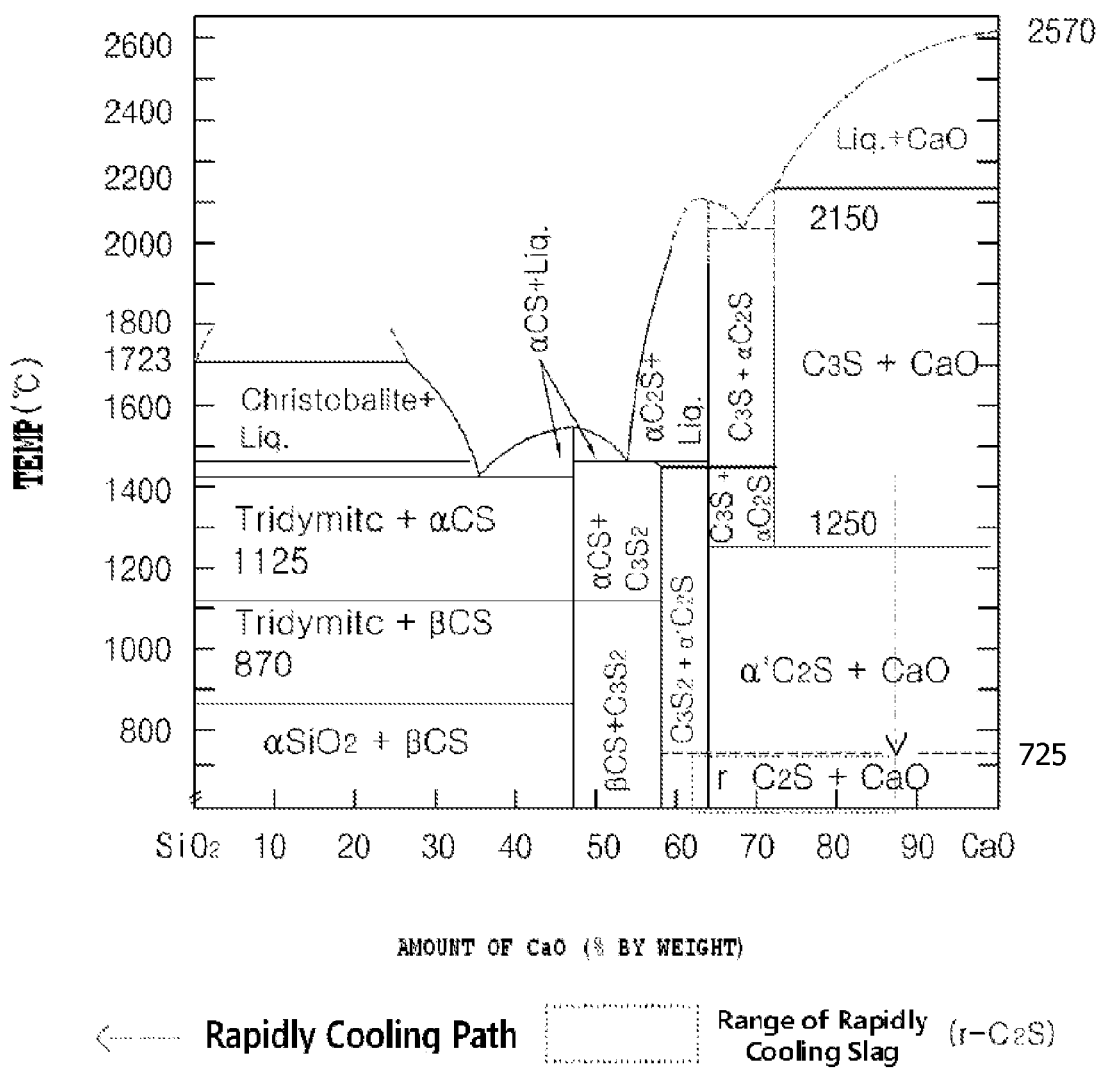
FIG. 3 is a graph illustrating a cooling process of reduced slag according to the present invention.

However, when the reduced slag is slowly cooled, degradation of free-calcium oxide vigorously occurs at 700° C. to 1200° C. due to high basicity, a molar ratio of CaO to SiO2, as illustrated in FIG. 3. Accordingly, since the cooling process of the molten electric arc furnace reduced slag passes through this temperature range quickly, degradation of the free-calcium oxide is suppressed in the rapidly cooled reduced slag according to the present invention. This may be confirmed based on the chemical composition of the rapidly cooled reduced slag measured using XRF as illustrated in FIG. 1.

Figure 4:
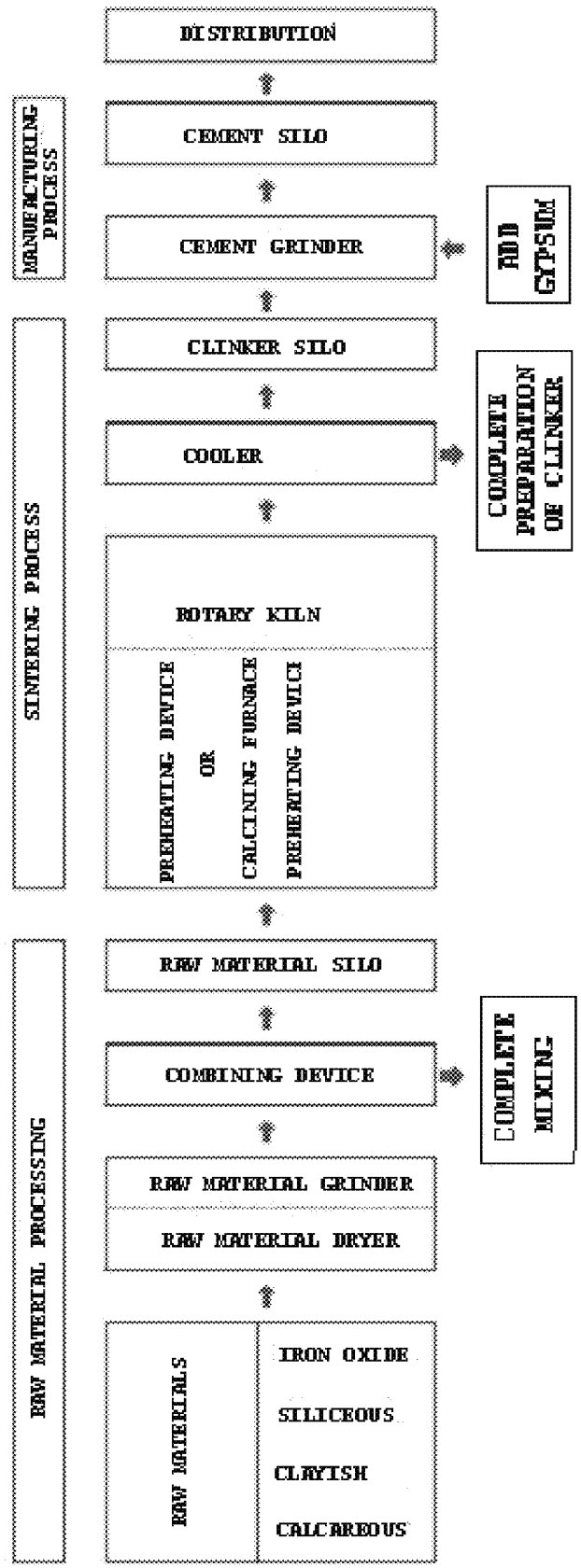
FIG. 4 is a block diagram illustrating a process of manufacturing ordinary Portland cement.

Meanwhile, as illustrated in FIG. 4, ordinary Portland cement is manufactured by mixing calcareous raw materials and clayish raw materials in an appropriate ratio, and adding siliceous raw materials and iron oxide raw materials into the mixture in order to adjust the composition in accordance with desired properties, grinding the mixture, adding the ground mixture into a kiln, sintering the mixture at about 1,450° C. to prepare clinker, rapidly cooling the clinker, adding a small amount of gypsum as a setting adjuster, and grinding the resultant.

Figure 5:
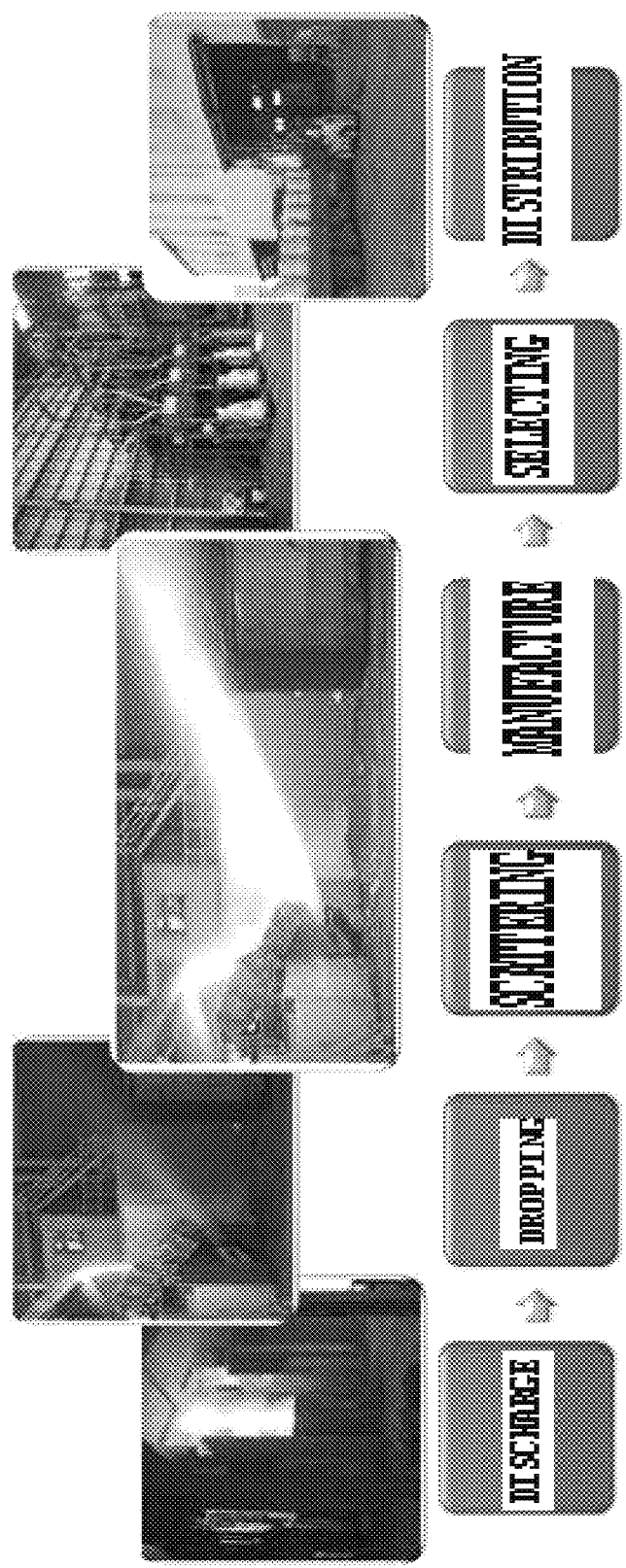
FIG. 5 is a diagram illustrating a process of manufacturing reduced slag powder according to the present invention.

This process of manufacturing ordinary Portland cement is similar to the process of manufacturing rapidly cooled electric arc furnace reduced slag according to the present invention. That is, in an iron manufacturing process, a melting temperature of iron ore is 1,500° C., which is higher than a temperature required for sintering cement, i.e., 1,450° C. Thus, it is determined that the sintering process of slag is completed in an electric arc furnace. Accordingly, when the slag of high temperature is rapidly cooled and ground as illustrated in FIG. 5, powder with high activity as the clinker of cement may be obtained.

Figure 6:
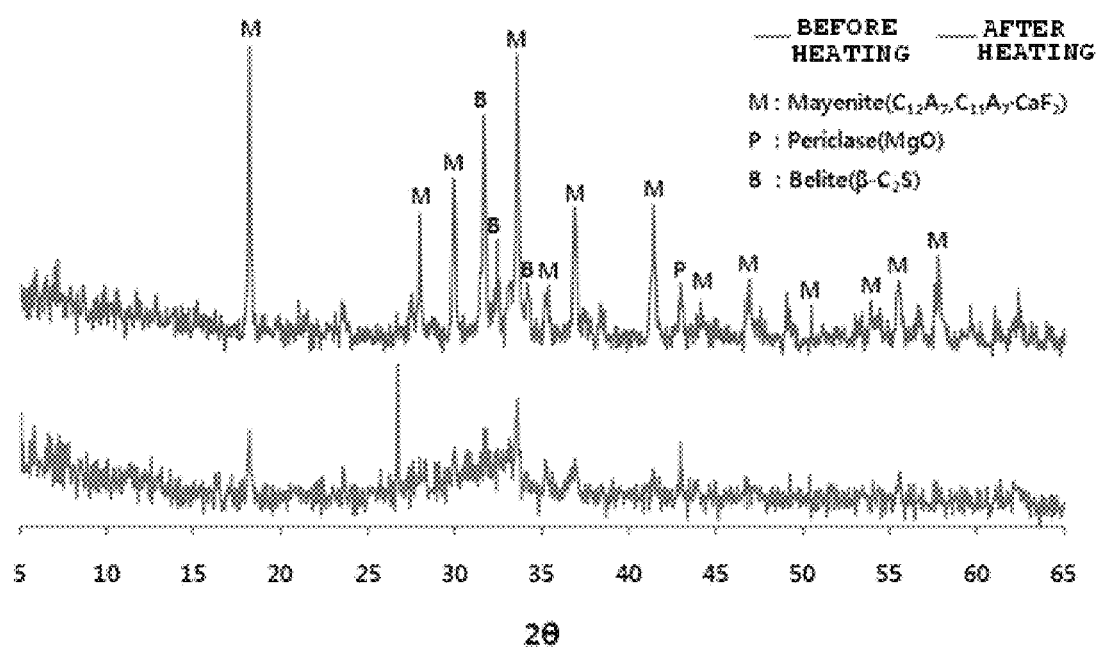
FIG. 6 is an XRD graph of reduced slag according to the present invention.

In order to confirm this technical idea, the rapidly cooled electric arc furnace reduced slag was evaluated by use of XRD to measure mineral composition thereof. As illustrated in FIG. 6, it was confirmed that the rapidly cooled slag includes a large amount of Mayenite (C12A7, 12CaO.Al2O3), as a rapid hardening hydrate, and a large amount of β-C2S (Belite, β-2CaO.SiO2), as a main constituent compound of cement improving hydraulicity.

Now, the present invention will be described in more detail with reference to the following examples. These examples are provided only for illustration of the present invention and should not be construed as limiting the scope and spirit of the present invention.

Example 1

Measuring Basic Physical Properties of Rapidly Cooled Reduced Slag

1) Rapid Cooling

Iron slag, which is a by-product of an iron production process and discharged through an outlet, is collected using pots, and the pots are moved for a rapid cooling process. The moved slag is scattered into the air using high-pressure gas while being dropped through a tundish at a constant slope to prepare rapidly cooled particulate reduced slag. This process is illustrated in FIG. 5.

2) Basic Properties of Rapidly Cooled Reduced Slag

Physical property: True density: 3.17/g

Analysis of oxide: Rapidly cooled reduced slag includes 50% by weight of CaO, 7% by weight of SiO2, and 21% by weight of Al2O3 as shown in FIG. 1.

Mineral analysis: Rapidly cooled reduced slag includes a large amount of Mayenite (C12A7, 12CaO.Al2O3) and a large amount of β-C2S (Belite, β-2CaO.SiO2), which is a main compound constituting cement and considerably improves hydraulicity, as illustrated in FIG. 6. C12A7 is a mineral that rapidly sets in the event of reaction with water, thereby having ultra-rapid hardening effects, and β-C2S reacts slowly with water so as to continuously improve strength.

Example 2

Setting Test of Rapidly Cooled Reduced Slag

1) Method

Setting time was measured at 10 minutes after molding a sample and every 30 seconds using a method of measuring setting time of hydraulic cement in accordance with KS L 5108 using a Vicat needle.

2) Test Results

Figure 7:
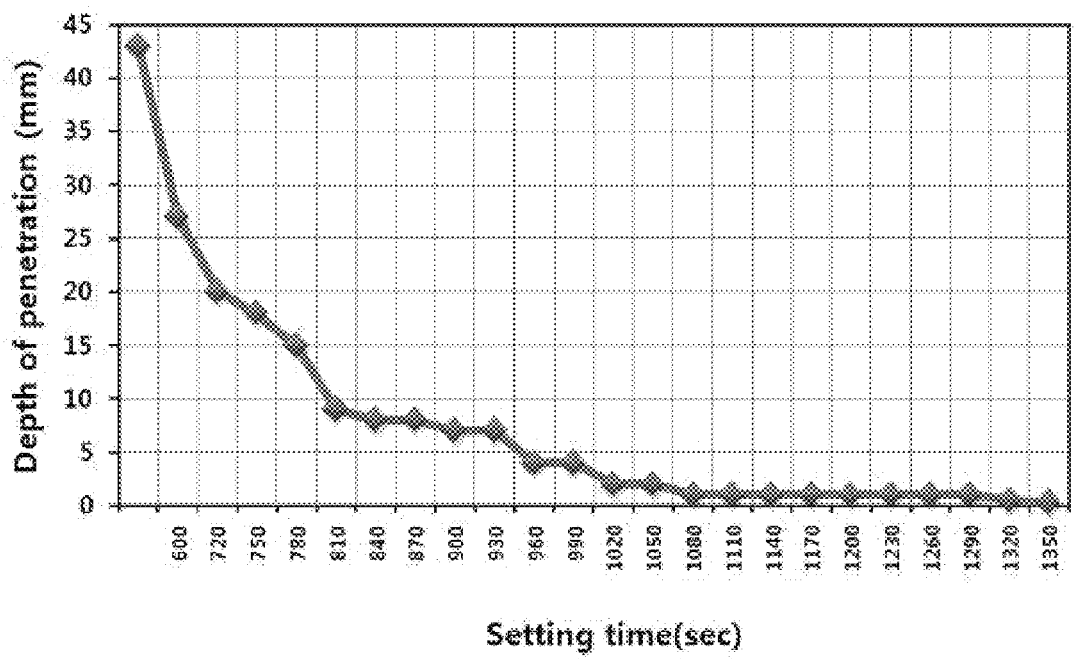
FIG. 7 is a graph illustrating test results of setting of reduced slag according to the present invention.

According to the regulations, setting time of ordinary Portland cement is measured at 30 minutes after molding a sample and every 15 minutes. According to the result shown in FIG. 7, it can be confirmed that the rapidly cooled reduced slag is rapidly set.

This result is caused by the composition of the reduced slag powder according to the present invention, which includes 50% by weight of CaO, 7% by weight of SiO2, and 21% by weight of Al2O3, as well as by rapid hardening property of Mayenite (C12A7, 12CaO.Al2O3) as illustrated in FIG. 1. Furthermore, the reduced slag powder according to the present invention includes alumina (Al2O3), which accelerates the hardening process and improves early strengthening, corrosion resistance, and fire resistance, twice to seven as much as that of ordinary Portland cement or ultra-rapid hardening cement, and magnesia (MgO), which accelerates the hardening process, improves strength, and prevents cracking, twice to three times as much as that of ordinary Portland cement or ultra-rapid hardening cement.

Example 3

Three-Component Analyses of Reduced Slag According to the Present Invention and Portland Cement CaO, SiO2, and Al2O3, as main components of rapidly cooled reduced slag according to the present invention and ordinary Portland cement, were analyzed, and the results are shown in FIG. 2. That is, the three-component analysis result of the rapidly cooled reduced slag according to the present invention is similar to that of ultra-rapid hardening cement.

As is apparent from the above description, according to the rapidly cooled reduced slag according to the present invention, environmental problems of conventional slow-cooled treatment, such as generations of fugitive dust, landfill leachate, and high noise, are removed. The ultra-rapid hardening hydraulic binder according to the present invention may be applied to a variety of fields requiring rapid hardening and may also replace ordinary Portland cement by adjusting setting time and hardening time by mixing with gypsum. Since the ordinary Portland cement emitting a large amount of carbon dioxide is replaced, green house gas emissions may be directly reduced. Accordingly, the ultra-rapid hardening hydraulic binder has high industrial applicability as an alternative to cement.

What is claimed is:

1. An ultra-rapid hardening hydraulic binder comprising:
reduced slag powder prepared by rapidly cooling molten electric arc furnace reduced slag, said reduced slag powder having a fineness of 3,000 to 12,000 cm$^2$/g;
wherein said reduced slag powder comprises 40 to 60% by weight of CaO, 5 to 15% by weight of SiO$_2$, 15 to 25% by weight of Al$_2$O$_3$, and magnesia (MgO, Periclase) of an amount twice to three times greater than that of ordinary Portland cement or ultra-rapid hardening cement, the reduced slag powder not having free calcium oxide (free CaO) therein, wherein said reduced slag powder further comprises mayenite (C12A7, 12CaO.Al2O3), as a rapid hardening hydrate, and β-C2S (Belite, β-2CaO.SiO2), as a main constituent compound of cement to improve an hydraulicity;
gypsum selected from the group consisting of anhydrous gypsum, natural gypsum, and hemi-hydrated gypsum to control reaction rate of rapid hardening;
wherein the amount of Al$_2$O$_3$ in the reduced slag powder is twice to seven times greater than that of ordinary Portland cement or ultra-rapid hardening cement to substantially improve rapid hardening, early strengthening, corrosion resistance, and fire resistance properties.

* * * * *